Patented Oct. 2, 1934

1,975,092

UNITED STATES PATENT OFFICE 1,975,092

DENATURANT FOR ETHYL ALCOHOL

Louis J. Figg, Jr., Kingsport, Tenn., assignor to Eastman Kodak Company, Rochester, N. Y., a corporation of New York No Drawing. Application December 12, 1931, Serial No. 580,737

4 Claims. (Cl. 202—77)

This invention relates to the denaturing of ethyl alcohol, to compositions for use as denaturants, and to alcohol so denatured. It is an object of my invention to provide a denaturant which will render ethyl alcohol containing it unfit for use as a beverage, which cannot be economically removed from the alcohol by any known methods, which will not render the alcohol unfit for industrial uses in which completely denatured alcohol has customarily been employed, and which will be free from methanol. It is a further object of my invention to provide a completely denatured alcohol which will be free from methanol.

In my copending application Serial No. 562,267, filed September 11, 1931, I have described the manufacture of a denaturant oil by washing and distilling the oils produced in the purification of crude methanol from hardwood distillation. Hardwood is subjected to destructive distillation in oven retorts in known manner, to produce charcoal and a liquid distillate commonly known as pyroligneous acid. The pyroligneous acid is allowed to settle in settling tanks. At this point a tarry substance known as settled tar or insoluble tar settles out. The supernatant liquid is decanted off and distilled in a continuous rectifying still, which separates it into crude acetic acid and crude methanol. The crude methanol is then diluted with sufficient water to produce 30% methanol. It is at this point that the oils separate out which I purify and fractionate for use as denaturants, the oils separating by stratification and being decanted off from the 30% methanol. Or, I may obtain the oils at any suitable step in the purification of crude methanol by whatever method employed therefor.

According to one method of washing and fractionating these oils, the oils are run into a wash tank; water is added to the oils, the mixture is vigorously agitated, and the two layers are allowed to separate. The oily layer separates out on top, while the water layer is drawn off at the bottom and discarded to the sewer. The washed oil, free from methanol, is then pumped into the kettle of the rectifying still. This still comprises a bubble-plate column, a dephlegmator and a condenser, and is provided with suitable tanks for receiving the oil fractions. Low-pressure steam is admitted to a heating coil in the kettle to furnish heat for the distillation. The oils distill over at from 41° to 230° C. The fraction distilling at from 41° to 75° C. is cut to one of the receiving tanks, the 75–150° C. fraction to another, and the 150–230° C. fraction to a third tank. The fraction boiling at 75–150° C. is that which I prefer as a denaturant, although all three fractions are useful as such.

The purified oils (the middle fraction) thus obtained have a specific gravity of 0.860–0.880 at 15.6° C. They are soluble to the extent of 84% in a 5% sodium hydroxide solution. They are also soluble in acetone, methanol, methyl acetate, and methyl-ethyl ketone. They are unpalatable and have a very unpleasant odor even when highly diluted, and are soluble in ethyl alcohol in all concentrations necessary for denaturing.

As an ethyl alcohol denaturant, I prefer to use the fraction of these oils which distills at from 75° to 150° C. I may, however, use the fraction which distills at from 41° to 150° C., or I may collect the entire distillate, distilling at from 41° to 230° C., in one receiver, and use the whole distillate as a denaturant or I may employ a middle fraction starting at 41° to 100° C. and ending at 150° to 200° C. as will be apparent. In the application above referred to it was stated that although it is possible to add the denaturant oil directly to the alcohol, it has been found preferable to dissolve the oil first in an organic solvent which is miscible with both the oil and the ethyl alcohol, and then to add the resulting solution to the alcohol. For instance, the oil may be dissolved in a quantity of acetone or ethyl alcohol or in a mixture of the two and the solution then added to the ethyl alcohol which it is desired to denature. Similarly, I may employ as solvents, other of the lower aliphatic alcohols (except methanol) such for instance as isopropyl, butyl or amyl alcohol or mixtures thereof.

I have now found that certain of these organic solvents are especially advantageous, namely, the liquid hydrocarbons. Examples of the hydrocarbons which are suitable are benzene, gasoline, and kerosene. My invention may be carried out as follows:

25 cc. of the fraction of the denaturant oil, described in my said application Serial No. 562,267, which distills at from 75° C. to 150° C. is dissolved in 975 cc. of the gasoline of commerce (free, of course, from anti-knock compounds). 50 cc. of this solution is then added to a liter of ethyl alcohol to make a completely denatured alcohol which is unsuitable for beverage purposes and from which the denaturant cannot be removed with any degree of economy or facility. It will be understood that I may vary the proportions of denaturant oil and/or gasoline or other hydrocarbon without departing from the spirit or scope of this invention. In place of gasoline I may use any other liquid hydrocarbon which is miscible with the oil and with ethyl alcohol, such, for instance, as any of the liquid hydrocarbons mentioned above. Moreover, I may use a mixture of liquid hydrocarbons, or a mixture of a hydrocarbon with any one of the solvent alcohols above mentioned. For instance, I may use a mixture of ethyl alcohol and gasoline for dissolving the denaturant oil. The ethyl alcohol, for instance, which I use for dissolving the wood oil (along with the hydrocarbon) may be 95% ethyl alcohol, or any denatured ethyl alcohol free from methanol.

By thus following my invention, a denatured ethyl alcohol can be produced which is unfit for beverage purposes. Furthermore, these hydrocarbons are cheap and do not add to the expense of the alcohol as a commodity; they do not prevent the alcohol from being used in most commercial operations and do not decrease the effectiveness of the oil as a denaturant.

What I claim as my invention and desire to be secured by Letters Patent of the United States is:

1. A methanol-free denaturant for ethyl alcohol which comprises a liquid hydrocarbon and, as an essential denaturing element, washed alcohol oil having a specific gravity of approximately 0.86 to 0.88 and a boiling range from approximately 75° C. to 150° C. prepared by separating and distilling the major proportion of the oils contained in the crude aqueous-methanol fraction obtained from pyroligneous crude resulting from hardwood distillation and condensing the fraction boiling between approximately 75° C. and 150° C.

2. A methanol-free denaturant for ethyl alcohol which comprises gasoline and, as an essential denaturing element, washed alcohol oil having a specific gravity of approximately 0.86 to 0.88 and a boiling range from approximately 75° C. to 150° C. prepared by separating and distilling the major proportion of the oils contained in the crude aqueous-methanol fraction obtained from pyroligneous crude resulting from hardwood distillation and condensing the fraction boiling between approximately 75° C. and 150° C.

3. A methanol-free denaturant for ethyl alcohol which comprises a liquid hydrocarbon and an aliphatic alcohol containing from three to six carbon atoms and, as an essential denaturing element, washed alcohol oil having a specific gravity of approximately 0.86 to 0.88 and a boiling range from approximately 75° C. to 150° C. prepared by separating and distilling the major proportion of the oils contained in the crude aqueous-methanol fraction obtained from pyroligneous crude resulting from hardwood distillation and condensing the fraction boiling between approximately 75° C. and 150° C.

4. A methanol-free denaturant for ethyl alcohol which comprises gasoline and isopropyl alcohol and, as an essential denaturing element, washed alcohol oil having a specific gravity of approximately 0.86 to 0.88 and a boiling range from approximately 75° C. to 150° C. prepared by separating and distilling the major proportion of the oils contained in the crude aqueous-methanol fraction obtained from pyroligneous crude resulting from hardwood distillation and condensing the fraction boiling between approximately 75° C. and 150° C.

LOUIS J. FIGG, Jr.